United States Patent
Salter et al.

(10) Patent No.: US 10,132,460 B1
(45) Date of Patent: Nov. 20, 2018

(54) VEHICLE LIGHTING ASSEMBLY AND LIGHTING METHOD

(71) Applicant: Ford Global Technologies, LLC, Dearborn, MI (US)

(72) Inventors: Stuart C. Salter, White Lake, MI (US); Aaron Bradley Johnson, Allen Park, MI (US); Paul Kenneth Dellock, Northville, MI (US); Stephen Kenneth Helwig, Farmington Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/783,331

(22) Filed: Oct. 13, 2017

(51) Int. Cl.
| | | |
|---|---|---|
| *F21K 99/00* | (2016.01) | |
| *F21S 43/31* | (2018.01) | |
| *B60Q 1/48* | (2006.01) | |
| *B60Q 1/32* | (2006.01) | |
| *B60Q 1/30* | (2006.01) | |
| *F21S 43/20* | (2018.01) | |
| *F21S 43/40* | (2018.01) | |
| *F21S 43/33* | (2018.01) | |

(52) U.S. Cl.
CPC ............ *F21S 43/31* (2018.01); *B60Q 1/30* (2013.01); *B60Q 1/32* (2013.01); *B60Q 1/486* (2013.01); *F21S 43/26* (2018.01); *F21S 43/33* (2018.01); *F21S 43/40* (2018.01)

(58) Field of Classification Search
None
See application file for complete search history.

(56) References Cited

U.S. PATENT DOCUMENTS

| | | | |
|---|---|---|---|
| 4,249,160 A | 2/1981 | Chilvers | |
| 5,163,731 A | 11/1992 | Gold | |
| 8,840,289 B2 | 9/2014 | Lindsay et al. | |
| 2012/0182722 A1* | 7/2012 | Wu | B60R 13/005 362/157 |
| 2015/0267881 A1* | 9/2015 | Salter | F21V 9/16 362/84 |
| 2015/0307033 A1* | 10/2015 | Preisler | B60R 13/02 362/488 |
| 2017/0162047 A1 | 6/2017 | Garcia Lopez | |

(Continued)

FOREIGN PATENT DOCUMENTS

| | | |
|---|---|---|
| GB | 2405755 | 3/2005 |
| JP | H04212646 | 8/1992 |

OTHER PUBLICATIONS

U.S. Appl. No. 14/993,637, filed Jan. 12, 2016.
(Continued)

*Primary Examiner* — Elmito Breval
(74) *Attorney, Agent, or Firm* — Carlson, Gaskey & Olds, P.C.

(57) ABSTRACT

An exemplary vehicle lighting assembly includes, among other things, a lens, a light source, a phosphor layer, and a reflective layer that is separate from the lens and is disposed between the phosphor layer and the light source. An exemplary vehicle lighting method includes, among other things, activating a light source to charge a phosphor layer, and reflecting light from the phosphor layer through a lens using a reflective layer between the phosphor layer and the light source. The reflective layer is separate from the lens. The lens includes geometric features that reflect light.

20 Claims, 4 Drawing Sheets

(56) References Cited

U.S. PATENT DOCUMENTS

2018/0045393 A1\*  2/2018  Yagi ..................... F21S 41/675
2018/0106455 A1\*  4/2018  Uchida ................. F21S 41/30

OTHER PUBLICATIONS

U.S. Appl. No. 15/172,900, filed Jun. 3, 2016.
iD, CariD, Front & Rear Bumper Reflectors—Side Reflectors, retrieved from https://www.carid.com/reflectors.html on Aug. 24, 2017.

\* cited by examiner

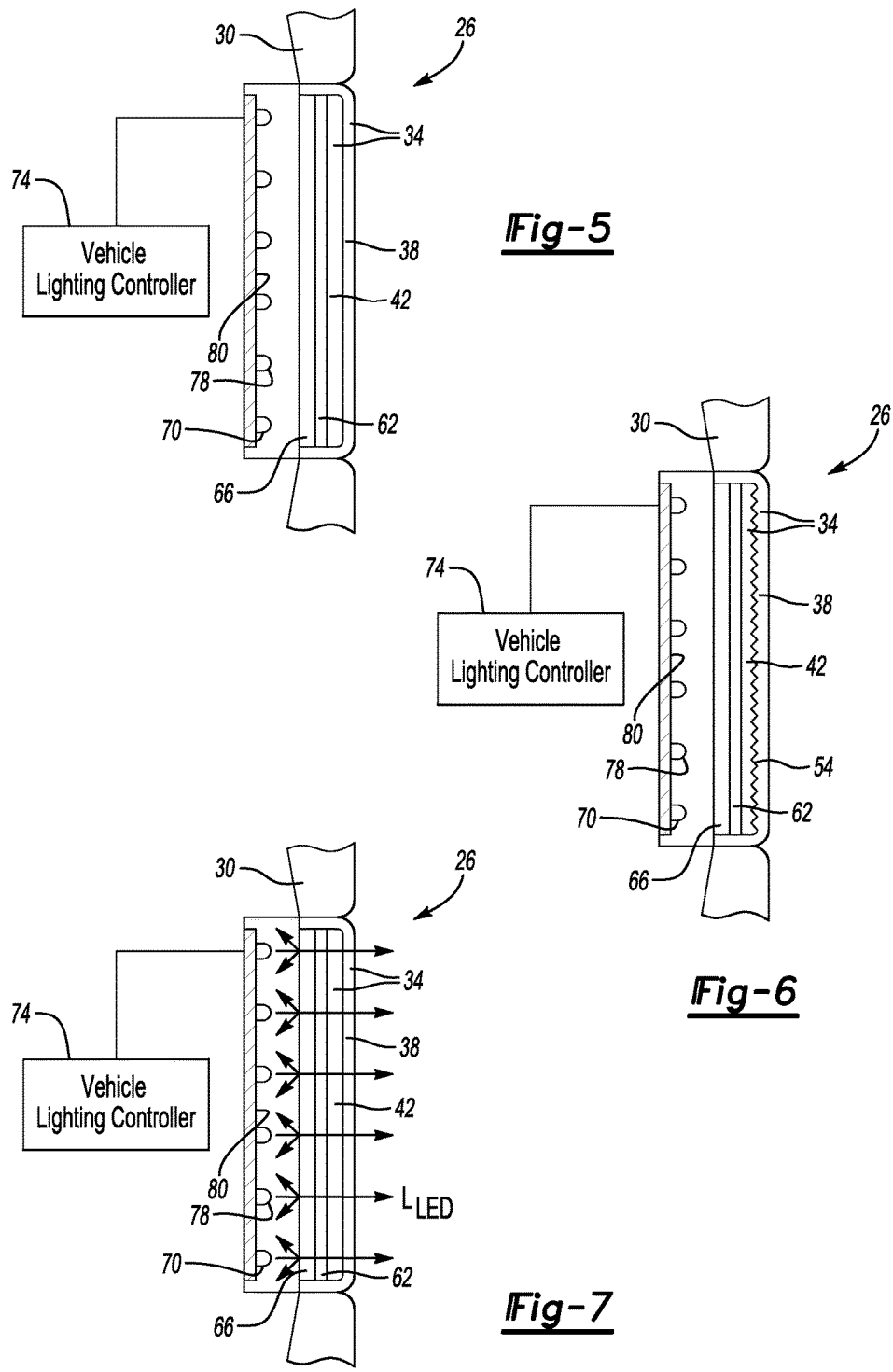

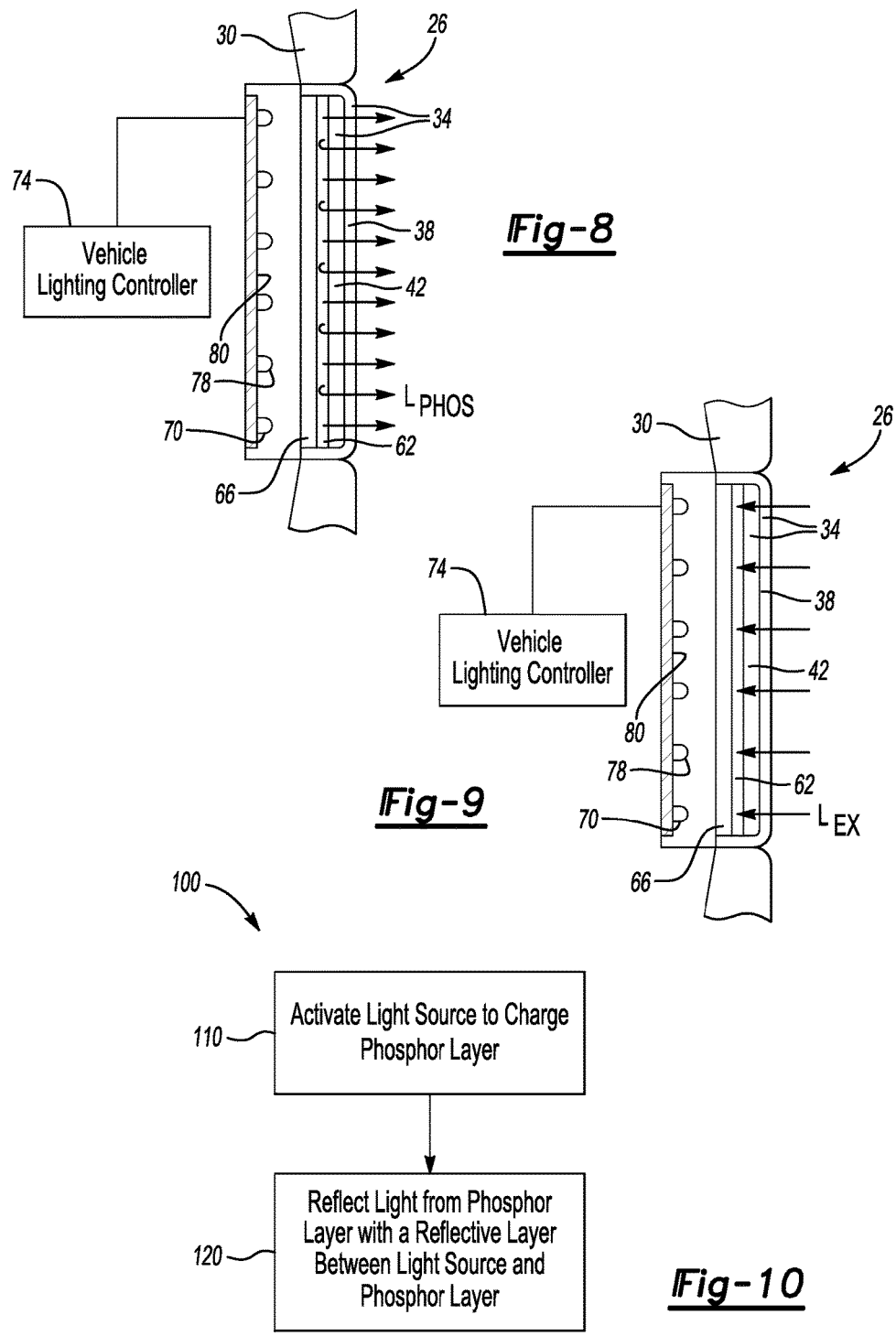

VEHICLE LIGHTING ASSEMBLY AND LIGHTING METHOD

TECHNICAL FIELD

This disclosure relates generally to a lighting assembly for a vehicle and, more particularly, to a lighting assembly incorporating both a phosphor layer and a reflective layer.

BACKGROUND

Vehicles include various types of lighting assemblies. Some lighting assemblies include a lens covering a light source. The lighting assemblies are illuminated when light from the light source emanates from the lamp assembly through the lens. Lighting assemblies can include headlamps, tail lamps, side markers, etc. Side markers, in some examples, help to identify a vehicle's presence, position, and direction of travel when viewed from an oblique angle. Side markers can be required to have an amber color.

The light sources within the lighting assemblies of a vehicle can be illuminated during a drive cycle. When the vehicle is parked and not operated, the light sources can be turned off or may be unable to illuminate due to insufficient battery power. Some illumination from lighting assemblies when the vehicle is parked and not operated could be beneficial. For example, if the vehicle is stranded along a roadside in a dimly lit area, some illumination from the lighting assemblies could help a driver of another vehicle visually locate the vehicle that is stranded.

SUMMARY

A vehicle lighting assembly according to an exemplary aspect of the present disclosure includes, among other things, a lens including geometric features that reflect light, a light source, a phosphor layer, and a reflective layer that is separate from the lens and is disposed between the phosphor layer and the light source.

In a further non-limiting embodiment of the foregoing assembly, the lens includes at least one first area with an array of the geometric features, and at least one second area free of the geometric features.

In a further non-limiting embodiment of any of the foregoing assemblies, the geometric features are molded-in.

In a further non-limiting embodiment of any of the foregoing assemblies, the geometric features are reflex cubes.

In a further non-limiting embodiment of any of the foregoing assemblies, the at least one first area comprises a plurality of first area strips, and the at least one second area comprises a plurality of second area strips. The first area strips and second area strips are arranged in an alternating fashion across the lens.

A further non-limiting embodiment of any of the foregoing assemblies includes an outer lens layer of the lens covering the at least one first area and the at least one second area.

In a further non-limiting embodiment of any of the foregoing assemblies, the light source includes at least one Light Emitting Diode.

In a further non-limiting embodiment of any of the foregoing assemblies, the light source includes a light pipe, a light blade, or both.

In a further non-limiting embodiment of any of the foregoing assemblies, the phosphor layer is molded together with the lens.

In a further non-limiting embodiment of any of the foregoing assemblies, the reflective layer is a vacuum metallized material.

In a further non-limiting embodiment of any of the foregoing assemblies, the reflective layer comprises a metalized aluminum material condensed on a polymer-based material.

A further non-limiting embodiment of any of the foregoing assemblies includes a controller configured to activate the light source in response to a signal indicating that a vehicle not having the light source is approaching the vehicle having the light source.

A further non-limiting embodiment of any of the foregoing assemblies includes a controller configured to activate the light source to charge the phosphor layer when a vehicle having the vehicle lighting assembly is parked.

A vehicle lighting method according to another exemplary aspect of the present disclosure includes, among other things, activating a light source to charge a phosphor layer, and reflecting light from the phosphor layer through a lens using a reflective layer between the phosphor layer and the light source. The reflective layer is separate from the lens. The lens includes geometric features that reflect light.

A further non-limiting embodiment of the foregoing method includes covering at least a portion of the light source, the phosphor layer, and the reflective layer with a lens.

A further non-limiting embodiment of any of the foregoing methods includes the lens includes at least one first area with an array of the geometric features, and at least one second area free of the geometric features.

In a further non-limiting embodiment of any of the foregoing methods, the geometric features are molded-in reflex cubes.

A further non-limiting embodiment of any of the foregoing methods includes charging the phosphor layer with light that passes through the at least one second area from another light source external to a vehicle having the light source having at least a portion covered by the lens.

In a further non-limiting embodiment of any of the foregoing methods, the light source resides within a first vehicle, and the method further includes activating the light source in response to a second vehicle approaching the first vehicle.

A further non-limiting embodiment of any of the foregoing methods includes activating the light source to charge the phosphor layer when a vehicle having the light source is parked.

BRIEF DESCRIPTION OF THE FIGURES

The various features and advantages of the disclosed examples will become apparent to those skilled in the art from the detailed description. The figures that accompany the detailed description can be briefly described as follows:

FIG. 5 illustrates a section taken along Line 5-5 in FIG. 3.

FIG. 6 illustrates a section taken along Line 6-6 in FIG. 3.

FIG. 7 illustrates the section of FIG. 5 when a lighting source of the lighting assembly is activated and charging a phosphor layer of the lighting assembly.

FIG. 8 illustrates the section of FIG. 5 when the phosphor layer is charged and emanating light.

FIG. 9 illustrates the section of FIG. 5 when a light source outside the lighting assembly is activated and charging the phosphor layer of the lighting assembly.

FIG. 10 illustrate a flow of an example vehicle lighting method utilizing the lighting assembly of FIG. 1 or 2.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

DETAILED DESCRIPTION

This disclosure relates generally to a lighting assembly for a vehicle and, in particular, a lighting assembly incorporating a phosphor layer and a reflective layer. A light source within the lighting assembly can be activated to charge the phosphor layer. The phosphor layer, when charged, emanates light. The reflective layer ensures that light emanated from the phosphor layer moves primarily through a lens of the lighting assembly.

Figure 1:
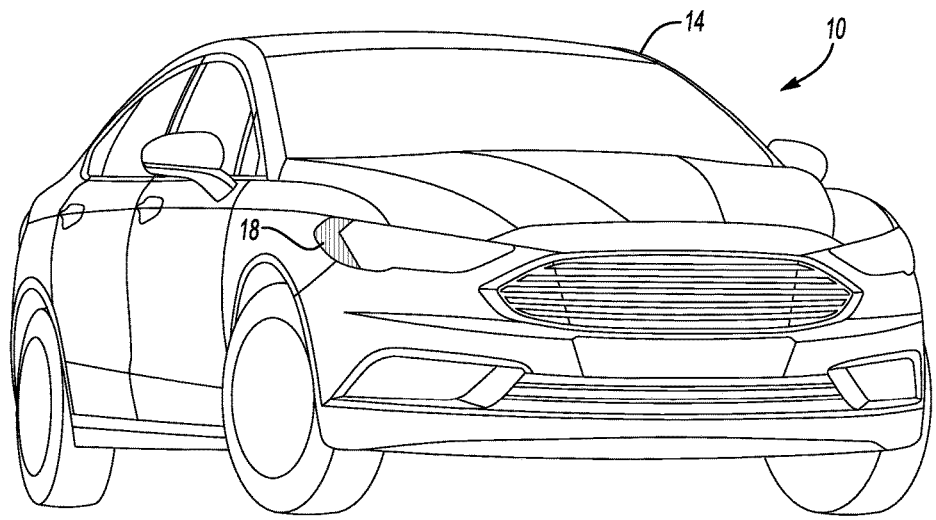
FIG. 1 illustrates a front view of a vehicle incorporating a lighting assembly according to an embodiment of the present disclosure.

Referring to FIG. 1, a front 10 of a vehicle 14 includes a lighting assembly 18 having a light source (not shown). The lighting assembly 18 can be considered to include a reflex plate. Reflex plates can reflect light from areas outside the vehicle 14.

Figure 2:
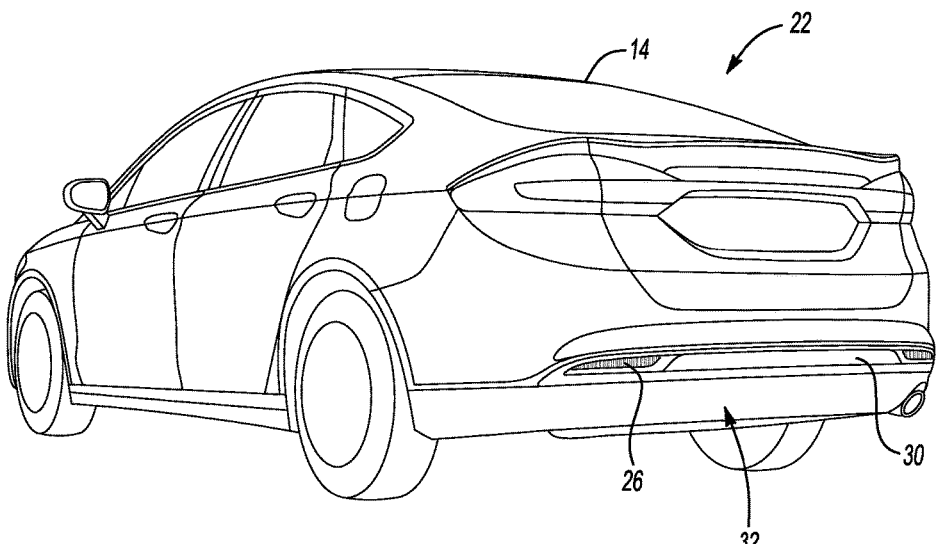
FIG. 2 illustrates a rear view of the vehicle of FIG. 1 and a lighting assembly according to another exemplary embodiment of the present disclosure.

Referring now to FIG. 2, a rear 22 of the vehicle 14 includes a lighting assembly 26 housed within a rear fascia 30. The lighting assembly 26 includes a reflex plate.

The vehicle 14 can include lighting assemblies 26 with reflex plates, such as, for example, a lighting assembly extending across more of the rear fascia into an area 32, or across a front fascia of the vehicle 14 below a grille of the vehicle 14.

Referring now to FIGS. 3-6 with continuing reference to FIG. 2, the lighting assembly 26 includes a lens 34. In this exemplary embodiment, the lens 34 comprises an outer lens layer 38 and a reflex layer 42. The lighting assembly 26 is considered to include a reflex plate due to the reflex layer 42.

The outer lens layer 38 can be molded from polymer or polymer-based materials. In some examples, the outer lens layer 38 is overmolded to the reflex layer 42.

In the exemplary embodiment, the outer lens layer 38 covers the reflex layer 42 to provide a protective layer that shields the reflex layer 42 and other portions of the lighting assembly 26 from damage due to, for example, road debris. The outer lens layer 38 is clear or transparent. In another example, the outer lens layer 38 is semi-transparent or translucent.

The reflex layer 42 includes first areas 46 and second areas 50 arranged in an alternating or interlaced strips disposed longitudinally across the lens 34. The strips of the first areas 46 and second areas 50 are vertically oriented in this example, and have a width of about five millimeters. Vertical is with reference to ground and the normal orientation of the vehicle 14 when driven or parked.

The first areas 46 represent areas of the reflex plate 42 having an array 54 of geometric features. In this example, the reflex plate 42 is molded to include the array 54 of geometric features within the first areas 46. The geometric features are, in this exemplary embodiment, reflex cubes 58 having a cubic geometry. The geometric features can be molded-in features of the reflex layer 42. The geometric features of the first areas 46 reflect light back toward a source of light.

In the exemplary reflex plate 42, the array 54 of geometric features reflect light through retro-reflection. Depending on the market the vehicle 14 is used in the first areas 46 of the reflex plate 42 with the geometric features may be required have a total area exceeding a threshold requirement.

The array 54 of geometric features reflect light outside the lighting assembly 26 back through the outer lens layer 38 to provide the lighting assembly 26 with reflective properties. For example, as another vehicle approaches the vehicle 14 from behind, headlights of the other vehicle may emanate light toward the lighting assembly 26. Some of the light emanating from the other vehicle is reflected by the array 54 of geometric features back toward the other vehicle.

The second areas 50 of the reflex plate 42 are free of the geometric features. In another example, the second areas 50 include fewer geometric features than the first areas 46. The second areas 50 permit light from the other vehicle to pass through the lens 34 to an interior of the lighting assembly 26 with relatively small amounts of reflection. Generally, in the exemplary embodiment, the second areas 50 are transparent, and the first areas 46, due to the array of geometric features, are semi-transparent or translucent.

Figure 3:
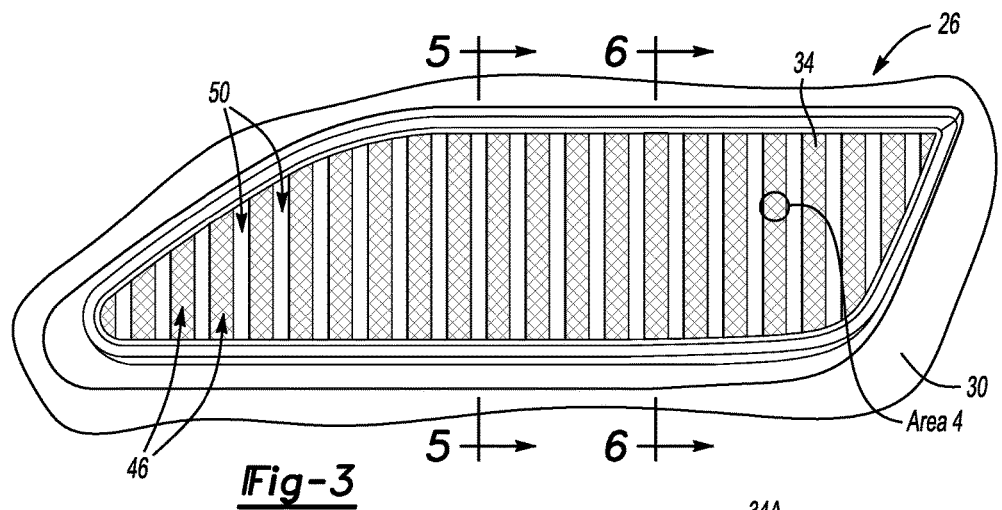
FIG. 3 illustrates a close-up view of the lighting assembly in FIG. 2.
Figure 3A:
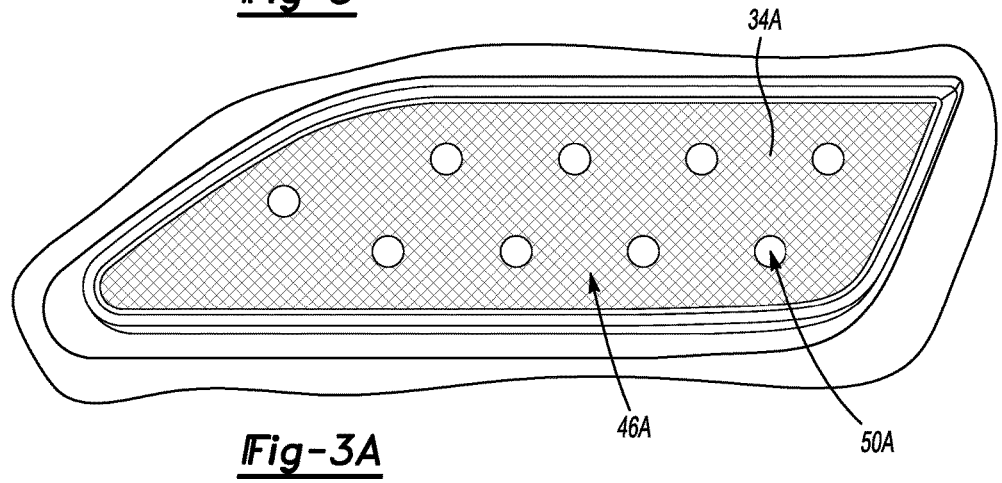
FIG. 3A illustrates a close-up view of a lighting assembly according to yet another exemplary embodiment.
Figure 4:
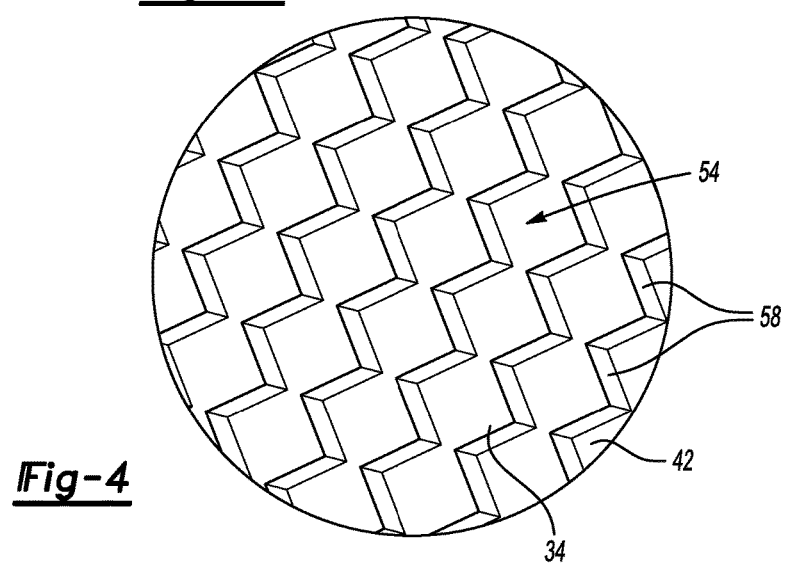
FIG. 4 illustrates a close-up view of Area-4 in FIG. 3.

Other geometries for the first areas 46 and the second areas 50 are possible and fall within the scope of this disclosure. For example, the first areas 46 and the second areas 50 could be strips that extend horizontally. In another example, a lens 34A could have a reflex layer with first areas 46A having their perimeters bounded by second areas 50A, as shown in FIG. 3A.

The reflex plate 42 can be a polymer or polymer-based material, such as polycarbonate or Polymethylmethacrylate. When molding the exemplary reflex plate 42, electroformed pins can be inserted into the mold to create the geometric features in the first areas 46. The reflex plate 42 is, in some examples, molded from a color tinted material such that the reflex plate 42 appears amber when unlit.

If yellow light from the lighting assembly 26 is desired, the reflex plate 42 can be tinted amber. White light passed through the reflex plate 42, which is tinted amber, is often perceived as yellow.

In addition to the lens 34, the lighting assembly 26 includes a phosphor layer 62, a reflective layer 66, and a light source 70 operably coupled to a vehicle lighting controller 74. The phosphor layer 62 is positioned between the lens 34 and the light source 70. The reflective layer 66 is also positioned between the lens 34 and the light source 70, and specifically between the phosphor layer 62 and the light source 70.

The phosphor layer 62, when exposed to light, charges and begins to emanate light. The light is not a result of heat. The phosphor layer 62, in the exemplary embodiment, is thus luminescent. The phosphor layer 62 can be, for example, a phosphorescent material, a florescent material, or some combination of these. The phosphor layer 62, in some examples, can be a phosphor paint, which could be applied to the reflex plate 42. In some examples, the lens 34 is clear, and the phosphor layer 62 is an amber colored paint. The lens 34, when viewed from an exterior of the vehicle 14, then appears amber due to the phosphor layer 62.

The example phosphor layer 62 is shown as separate from the lens 34. In another example, the phosphor layer 62 could be a phosphor material that is molded together and intermingled with a material composition of the lens 34.

The phosphor layer 62 can be a long persistence phosphor, such those sold under the Cereus White 8014 or Cereus White 8024 tradenames. In response to being exposed to a light source of 4100 kelvin at 100 foot-candles for five minutes, the phosphor layer 62 can emit about 550 millicandelas per meter squared for ten minutes, 159 millicandelas per meter squared for thirty minutes, and 70 millicandelas per meter squared for sixty minutes. The lighting assembly 26 thus can continue to emit visible light, even when the light source 70 is not activated.

The reflective layer 66 reflects light emanated from the phosphor layer 62 to ensure that a relatively large percentage of light emanated from the phosphor layer 62 propagates through the lens 34 rather than moving further into an interior of the lighting assembly 26.

The light source 70, in this exemplary embodiment, comprises a plurality of light emitting diodes (LEDs) 78 mounted on a circuit board 80. The light source 70 can be powered by an accessory battery of the vehicle 14 (FIGS. 1 and 2).

The vehicle lighting controller 74 can selectively activate the LEDs 78 to emit light from the LEDs 78 that propagates through the lens 34 to an exterior of the lighting assembly 26. In some exemplary embodiments, the LEDs 78 are ultraviolet LEDs. In other examples, the LEDs 78 include blue LEDs. The LEDs 78 could instead, or additionally, include amber-colored LEDs that include a phosphor within the LEDs such that the emitted light has an amber color. Some light emitted from the LEDs 78 can charge the phosphor layer 62.

The light source 70 could include other sources of light instead of, or in addition to, the LEDs 78. The light source 70 could be one or more incandescent light bulbs, for example. The light source 70 could comprise one or more LEDs of light pipe, one or more LEDs of a light blade, or both.

A light pipe can have an LED at an at least one end of a pipe. Typically, each light pipe includes an LED at each end of the pipe.

A light blade can include multiple LEDs arranged in a row. The perceived light from the LEDs in a light blade can merge to make the light appear as emanating from a single, longitudinally extending source, even though the light in the light blade is actually emanating from multiple individual LEDs.

The example lighting controller 74 can include a processor operatively linked to a memory portion. The example processor can be programmed to execute a program stored in the memory portion. The program may be stored in the memory portion as software code.

The program stored in the memory portion may include one or more additional or separate programs, each of which includes an ordered listing of executable instructions for implementing logical functions. The instructions enable the lighting controller 74 to activate the light source 70 such that the light source 70 emits light. The activation of the light source 70 could be in response to a command from a driver, or a signal from a sensor indicated that the sensor has detected another vehicle approaching the vehicle 14. The lighting controller 74 can activate the light source 70 when other lights of the vehicle 14, such as the headlights, are not activated. The lighting controller 74 can, in some examples, activate the light source 70 when a driver is not occupying the vehicle 14, such as when the vehicle 14 is stranded alongside a road and the driver has left the vehicle 14, or otherwise parked.

The reflective layer 66 is, in this exemplary embodiment, a vacuum metalized material. In particular, the exemplary reflective layer 66 is a metalized aluminum material condensed on a polymer or polymer-based material.

Although the exemplary embodiment shows the reflective layer 66 as spaced from the circuit board 80, the reflective layer 66 could, in some examples, be applied directly to the circuit board 80. For example, the reflective layer 66 could be a reflective paint that is applied to the circuit board 80.

In some exemplary embodiments, the reflective layer 66 can block about 90 percent of the light emanating from the light source 70 from moving through the lens 34 to an exterior of the lighting assembly 26. The exemplary ten percent of light from the LEDs 78 that passes through the reflective layer 66 is, however, suitable for charging the phosphor layer 62, and for emitting some light through the lens 34 to an exterior of the lighting assembly 26.

The light source 70, in the exemplary embodiment, emanates more light than a traditional incandescent sidemarker light bulb. Substantially the entire area of the reflex plate 42 that is visible from outside the vehicle 14, and particularly the first areas 46 with the array 54 of geometric features, refracts light emanating from the light source 70. This draws an observer's attention to the lighting assembly 25, especially during twilight hours and other low light conditions.

Referring to FIG. 7, the LEDs 78 are shown in an activated state such that the LEDs 78 emit light $L_{LED}$. The reflective layer 66 reflects some of the light $L_{LED}$ back toward the LEDs 78. Some of the light $L_{LED}$, however, passes through the reflective layer 68. The light $L_{LED}$ that passes through the reflective layer 68 can charge the phosphor layer 62. The light $L_{LED}$ that passes through the reflective layer 68 can also emanate through the lens 34 to an exterior of the lighting assembly 26.

Notably, if the light $L_{LED}$ that passes through the reflective layer 68 is insufficient to charge the phosphor layer 62, the intensity of the LEDs 78 can be increased by the vehicle lighting controller 74, additional LEDs could be added, or both.

Referring to FIG. 8, the phosphor layer 62 is in a charged state such that the phosphor layer 62 emits light $L_{PHOS}$. Some of the light $L_{PHOS}$ emitted from the phosphor layer 62 contacts the reflective layer 66 and is reflected back through the lens 34 to an exterior of the lighting assembly 26. Reflecting the light $L_{PHOS}$ emitted from the phosphor layer 62 can improve the passive performance of the phosphor layer 62 by redirecting the light $L_{PHOS}$ through the lens 34. The reflective layer 66 thus facilitates the propagation of the light $L_{PHOS}$ from the phosphor layer 62 through the lens 34 to an exterior of the lighting assembly 26.

Referring to FIG. 9, the phosphor layer 62 can be charged by light $L_{EX}$ from an exterior light source that is outside the lighting assembly 26. That is, the light $L_{EX}$ is from a light source other than the LEDs 78. The light $L_{EX}$ may be a headlight of another vehicle passing the vehicle 14 when the vehicle 14 is parked alongside a road. The light source $L_{EX}$ also could be light from the sun. The second areas 50 of the reflex plate permit the light $L_{EX}$ to pass through the lens 34 to a position where the light $L_{ex}$ can charge the phosphor layer 62.

As the vehicle 14 is parked alongside a road in, for example, a stranded position, the vehicle lighting controller 74 can periodically activate the LEDs 78 to provide the light $L_{LED}$ that charges the phosphor layer 62 as shown in FIG. 7. The phosphor layer 62 can be additionally charged by the light $L_{EX}$ from passing vehicles as shown in FIG. 9. Light emanating from the phosphor layer 62, as shown in FIG. 8, can help drivers of other vehicles locate the vehicle 14 so the other vehicles do not collide with the vehicle 14.

Referring to FIG. 10, a vehicle lighting method 100 can be used in connection with the lighting assembly 18 of FIG. 1, or the lighting assembly 26 of FIGS. 2 to 9. The method 100 can include a step 110 of activating a light source to charge a phosphor layer. Next, at a step 120, the light from the phosphor layer is reflected using a reflective layer between the phosphor layer and the light source.

The vehicle 14 with the lighting assembly 26 can exhibit numerous behaviors. For example, if the lighting assembly 26 is incorporated into the front 10 of the vehicle 14, the light source 70, when the vehicle 14 is parallel parked, can remain normally off. When a sensor of the vehicle 14, such as a sensor within a front collision avoidance system, detects a vehicle approaching the vehicle 14, the vehicle lighting controller 74 can activate and flash the light source 70 until the approaching vehicle moves past the parked vehicle 14. The flashing of the light source 70 alerts the driver in the approaching vehicle to the location of the parked vehicle 14. The flashing of the light source 70 further excites the phosphor layer 62 so that light continues to emanate from the lighting assembly 26 after the light source 70 is turned off. A time period for the vehicle 14 to flash the light source 70 in response to an approaching vehicle can be adjustable through a touch screen from between say, two to eight hours.

If the lighting assembly 26 is incorporated into a rear 22 of the vehicle 14, the vehicle lighting controller 74 could flash the light source 70 in response to another vehicle approaching the vehicle 14 from behind. The detection could be a signal sent to the vehicle lighting controller 74 from an ultrasonic parking assist or rear collision avoidance system of the vehicle 14.

The lighting controller 74 could also turn on the light source 70 when the approaching vehicle is within set distance limit of the vehicle 14, and then keep the light source 70 on for a time period, say sixty seconds. The set distance causing the lighting controller 74 to keep the light source 70 activated rather than flashing can be adjustable by a user through the touch screen from between say, six inches and two feet.

This methodology alerts approaching vehicle to the location of the vehicle 14. The activation of the light source 70 further excites the phosphor layer 62 so that light continues to emanate from the lighting assembly 26 after the light source 70 is turned off. The glowing light from the excited phosphor layer 62 helps the vehicle 14 be recognized by an approaching vehicle.

As the vehicle 14 is driven, the lighting controller 74 could activate the light source 70 when another vehicle is following too closely behind. A rear radar system of the vehicle 14 could send a signal to the lighting controller 74 that indicates the other vehicle is following too closely. The distance that the lighting controller 74 considers too close can vary based on the speed of the vehicle 14 and the other vehicle, and a distance required to stop the vehicle 14 and the other vehicle at those speeds. For example, if the other vehicle is closer than distance required to stop the other vehicle, the lighting controller 74 can automatically activate the light source 70 of the vehicle 14. The light source 70 can then be deactivated when the distance between the vehicle 14 and the other vehicle increases above the distance required to stop the other vehicle.

Features of some of the disclosed lighting assembly embodiments are particularly useful when a vehicle is parked during twilight hours, when the vehicle's headlamps and tail lamps are not typically on, to increase visibility of the vehicle. Alerting other approaching vehicles to the location of the vehicle can help prevent damage to the vehicle. Existing systems in the vehicle can be used for the alerting, for example, front and rear collision sensors, radar sensors, and park assist sensors.

Light sources within the lighting assembly can be activated periodically, even when the vehicle is unoccupied, to charge the phosphor layer and enhance vehicle visibility. Since the light sources are activated periodically rather than continuously, the lighting assembly does not draw as much power from a battery of the vehicle. The illumination from the lighting assembly can be extended for a longer period of time as the battery is drained more slowly.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

What is claimed is:

1. A vehicle lighting assembly, comprising:
   a lens including geometric features that reflect light;
   a light source;
   a phosphor layer; and
   a reflective layer that is separate from the lens and is disposed between the phosphor layer and the light source.

2. The vehicle lighting assembly of claim 1, wherein the lens includes at least one first area with an array of the geometric features, and at least one second area free of the geometric features.

3. The vehicle lighting assembly of claim 2, wherein the geometric features are molded-in.

4. The vehicle lighting assembly of claim 3, wherein the geometric features are reflex cubes.

5. The vehicle lighting assembly of claim 2, wherein the at least one first area comprises a plurality of first area strips, and the at least one second area comprises a plurality of second area strips, the first area strips and second area strips arranged in an alternating fashion across the lens.

6. The vehicle lighting assembly of claim 2, further comprising an outer lens layer of the lens covering the at least one first area and the at least one second area.

7. The vehicle lighting assembly of claim 1, wherein the light source comprises at least one Light Emitting Diode.

8. The vehicle lighting assembly of claim 1, wherein the light source comprises a light pipe, a light blade, or both.

9. The vehicle lighting assembly of claim 1, wherein the phosphor layer is molded together with the lens.

10. The vehicle lighting assembly of claim 1, wherein the reflective layer is a vacuum metallized material.

11. The vehicle lighting assembly of claim 1, wherein the reflective layer comprises a metalized aluminum material condensed on a polymer-based material.

12. The vehicle lighting assembly of claim 1, further comprising a controller configured to activate the light source in response to a signal indicating that a vehicle not having the light source is approaching the vehicle having the light source.

13. The vehicle lighting assembly of claim 1, further comprising a controller configured to activate the light source to charge the phosphor layer when a vehicle having the vehicle lighting assembly is parked.

14. A vehicle lighting method, comprising:
activating a light source to charge a phosphor layer; and
reflecting light from the phosphor layer through a lens using a reflective layer between the phosphor layer and the light source, the reflective layer separate from the lens, the lens includes geometric features that reflect light.

15. The vehicle lighting method of claim 14, further comprising covering at least a portion of the light source, the phosphor layer, and the reflective layer with a lens.

16. The vehicle lighting method of claim 15, wherein the lens includes at least one first area with an array of the geometric features, and at least one second area free of the geometric features.

17. The vehicle lighting method of claim 16, wherein the geometric features are molded-in reflex cubes.

18. The vehicle lighting method of claim 16, further comprising charging the phosphor layer with light that passes through the at least one second area from another light source external to a vehicle having the light source having at least a portion covered by the lens.

19. The vehicle lighting method of claim 14, wherein the light source resides within a first vehicle, and further comprising activating the light source in response to a second vehicle approaching the first vehicle.

20. The vehicle lighting method of claim 14, further comprising activating the light source to charge the phosphor layer when a vehicle having the light source is parked.

\* \* \* \* \*